(12) United States Patent
Li (10) Patent No.: US 12,223,957 B2
(45) Date of Patent: *Feb. 11, 2025

(54) VOICE INTERACTION METHOD, SYSTEM, TERMINAL DEVICE AND MEDIUM

(71) Applicant: BOE TECHNOLOGY GROUP CO., LTD., Beijing (CN)

(72) Inventor: Yingjie Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 310 days.

This patent is subject to a terminal disclaimer.

(21) Appl. No.: 17/752,094

(22) Filed: May 24, 2022

(65) Prior Publication Data

US 2022/0284900 A1   Sep. 8, 2022

Related U.S. Application Data

(63) Continuation-in-part of application No. 16/818,145, filed on Mar. 13, 2020, now Pat. No. 11,373,642.

(30) Foreign Application Priority Data

Aug. 29, 2019   (CN) .......................... 201910808807.0

(51) Int. Cl.
G10L 15/22     (2006.01)
G10L 25/51     (2013.01)

(52) U.S. Cl.
CPC .............. *G10L 15/22* (2013.01); *G10L 25/51* (2013.01)

(58) Field of Classification Search
CPC ..... G10L 15/22; G10L 25/51; G06F 16/3329; G06F 16/3344; G06F 40/30
See application file for complete search history.

(56) References Cited

U.S. PATENT DOCUMENTS 4,403,845 A   9/1983   Buelens et al.
5,668,958 A   9/1997   Bendert et al.
(Continued)

FOREIGN PATENT DOCUMENTS

CN   105206275 A   12/2015
CN   106710596 A   5/2017
(Continued)

OTHER PUBLICATIONS

Google Translation of CN 112185370 A , 2021, https://patents.google.com/patent/CN112185370A/en?oq=CN+112185370+A+ (Year: 2021).*

(Continued)

*Primary Examiner* — Eric Yen
(74) *Attorney, Agent, or Firm* — The Webb Law Firm (57) ABSTRACT

The present disclosure discloses a voice interaction method, system, terminal device and medium, with operations performing voice recognition on collected voice signals to acquire an input sentence; semantically matching the input sentence with cached sample sentences, determining whether there is a sample sentence having same or similar semantics as the input sentence among the cached sample sentences; if yes, acquiring cached response content having the same or similar semantics as the input sentence; if not, sending at least one of the input sentence or the collected voice signals to a server; receiving response content or the collected voice signals, as response content of the input sentence, acquired through semantic understanding according to a knowledge base, responding to the input sentence according to the response content of the input sentence, and updating at least one of the cached sample sentences or the response content of the cached sample sentences.

20 Claims, 4 Drawing Sheets

(56) References Cited

U.S. PATENT DOCUMENTS

| | | | |
|---|---|---|---|
| 5,682,542 A * | 10/1997 | Enomoto | G06F 40/253 |
| | | | 715/235 |
| 6,377,944 B1 * | 4/2002 | Busey | H04L 9/40 |
| 7,315,826 B1 | 1/2008 | Guheen et al. | |
| 9,990,176 B1 * | 6/2018 | Gray | G06F 16/957 |
| 10,558,633 B1 | 2/2020 | Kim | |
| 10,713,289 B1 | 7/2020 | Mishra et al. | |
| 12,093,250 B2 * | 9/2024 | Lai | G06F 16/288 |
| 2002/0023144 A1 | 2/2002 | Linyard et al. | |
| 2002/0046291 A1 | 4/2002 | O'Callaghan et al. | |
| 2002/0198883 A1 | 12/2002 | Nishizawa et al. | |
| 2003/0046434 A1 | 3/2003 | Flanagin et al. | |
| 2004/0030556 A1 * | 2/2004 | Bennett | G06F 40/289 |
| | | | 704/E15.04 |
| 2004/0044516 A1 * | 3/2004 | Kennewick | G10L 15/1822 |
| | | | 704/E15.04 |
| 2004/0230897 A1 | 11/2004 | Latzel | |
| 2005/0240413 A1 | 10/2005 | Asano et al. | |
| 2006/0020473 A1 | 1/2006 | Hiroe et al. | |
| 2008/0104065 A1 * | 5/2008 | Agarwal | G06Q 10/10 |
| 2009/0138477 A1 | 5/2009 | Piira et al. | |
| 2009/0327234 A1 | 12/2009 | Coladonato et al. | |
| 2010/0057723 A1 | 3/2010 | Rajaram | |
| 2012/0015642 A1 | 1/2012 | Sec | |
| 2012/0303358 A1 * | 11/2012 | Ducatel | G06F 40/30 |
| | | | 704/9 |
| 2014/0200896 A1 * | 7/2014 | Lee | H04N 21/42203 |
| | | | 704/270.1 |
| 2015/0161996 A1 * | 6/2015 | Petrov | G06F 40/289 |
| | | | 704/257 |
| 2016/0147873 A1 * | 5/2016 | Henmi | G06F 16/90332 |
| | | | 707/728 |
| 2016/0196258 A1 | 7/2016 | Ma et al. | |
| 2016/0217129 A1 * | 7/2016 | Lu | G06F 40/284 |
| 2016/0294970 A1 | 10/2016 | Robinson | |
| 2017/0295236 A1 | 10/2017 | Kulkarni et al. | |
| 2018/0150739 A1 * | 5/2018 | Wu | G06N 20/10 |
| 2018/0166077 A1 | 6/2018 | Yamaguchi et al. | |
| 2018/0190292 A1 | 7/2018 | Xu | |
| 2018/0285348 A1 | 10/2018 | Shu et al. | |
| 2018/0285928 A1 | 10/2018 | Kirmani et al. | |
| 2018/0349256 A1 * | 12/2018 | Fong | G06F 40/284 |
| 2018/0373758 A1 * | 12/2018 | Obradovic | G06F 11/3433 |
| 2019/0103102 A1 * | 4/2019 | Tseretopoulos | G06Q 50/01 |
| 2019/0114082 A1 | 4/2019 | Pan et al. | |
| 2019/0139544 A1 | 5/2019 | Chen et al. | |
| 2019/0163735 A1 | 5/2019 | Xu et al. | |
| 2019/0180756 A1 | 6/2019 | Yang | |
| 2019/0354630 A1 * | 11/2019 | Guo | G10L 15/08 |
| 2019/0370273 A1 | 12/2019 | Frison | |
| 2022/0114824 A1 * | 4/2022 | Tomita | G06V 30/19093 |

FOREIGN PATENT DOCUMENTS

| | | | |
|---|---|---|---|
| CN | 106875950 A | | 6/2017 |
| CN | 106897263 A | | 6/2017 |
| CN | 107102982 A | | 8/2017 |
| CN | 107945798 A | | 4/2018 |
| CN | 108376544 A | | 8/2018 |
| CN | 108549637 A | | 9/2018 |
| CN | 108932342 A | | 12/2018 |
| CN | 109102809 A | | 12/2018 |
| CN | 109147788 A | | 1/2019 |
| CN | 109360555 A | | 2/2019 |
| CN | 112185370 A | * | 1/2021 |
| EP | 1344148 B1 | | 12/2005 |

OTHER PUBLICATIONS

Non-Final Office Action dated Oct. 5, 2021 for U.S. Appl. No. 16/818,145.

Examiner-Initiated Interview Summary dated Feb. 9, 2022 for U.S. Appl. No. 16/818,145.

Notice of Allowance and Fee(s) Due dated Feb. 24, 2022 for U.S. Appl. No. 16/818,145.

* cited by examiner

> S21: performing, by the terminal device, word segmentation on the input sentence and each sample sentence cached by the terminal device, respectively > S22: acquiring, by the terminal device, a word vector of one or more words in the input sentence according to a word segmentation result for the input sentence and a plurality of word vectors cached by the terminal device, and acquiring, by the terminal device, a word vector of one or more words in each sample sentence according to a word segmentation result for each sample sentence and the plurality of word vectors cached by the terminal device.

> S23: generating, by the terminal device, a sentence vector of the input sentence according to the word vector of the one or more words in the input sentence, and generating, by the terminal device, a sentence vector of each sample sentence according to the word vector of the one or more words in each sample sentence;

> S24: performing, by the terminal device, a similarity calculation on the input sentence and each sample sentence according to the sentence vector of the input sentence and the sentence vector of each sample sentence;

> S25: determining whether there is a sample sentence having the same or similar semantics as the input sentence among the cached sample sentences based on a result of the similarity calculation.

VOICE INTERACTION METHOD, SYSTEM, TERMINAL DEVICE AND MEDIUM

This application is a continuation-in-part of and claims priority to U.S. application Ser. No. 16/818,145, which was filed on Mar. 13, 2020, entitled "VOICE INTERACTION METHOD, SYSTEM, TERMINAL DEVICE AND MEDIUM," and claims priority to Chinese Patent Application No. 201910808807.0, entitled "VOICE INTERACTION METHOD AND SYSTEM, TERMINAL DEVICE, COMPUTER DEVICE AND MEDIUM", which was filed on Aug. 29, 2019, the disclosure of both of which are hereby incorporated by reference in its entirety for all purposes.

TECHNICAL FIELD

The present disclosure relates to the technical field of voice interaction, and in particular relates to a voice interaction method, system, terminal device and medium.

BACKGROUND

At present, intelligent devices with a voice interaction function applicable to home control, vehicle-mounted device interaction, personal entertainment and the like are gradually popularized.

SUMMARY

According to a first aspect of the present disclosure, there is provided a method performed by a terminal device, comprising: performing voice recognition on collected voice signals to acquire an input sentence; performing semantic matching between the input sentence and cached sample sentences to determine whether there is a sample sentence having the same or similar semantics as the input sentence among the cached sample sentences; in response to determining that there is a sample sentence having the same or similar semantics as the input sentence among the cached sample sentences, acquiring cached response content corresponding to the sample sentence having the same or similar semantics as the input sentence as first response content of the input sentence; in response to determining that there is no sample sentence having the same or similar semantics as the input sentence among the cached sample sentences, sending at least one of the input sentence or the collected voice signals to a server, and receiving transmitted response content of the at least one of the input sentence or the collected voice signals from the server as the first response content of the input sentence, wherein the transmitted response content of the at least one of the input sentence or the collected voice signals from the server is acquired by the server through semantic understanding of the at least one of the input sentence or the collected voice signals according to a knowledge base stored on the server; responding to the input sentence according to the first response content of the input sentence; and updating at least one of the cached sample sentences or the response content of the cached sample sentences.

In some embodiments, the first response content of the input sentence further comprises at least one of a control instruction or voice response content. The responding to the input sentence according to the first response content of the input sentence includes at least one of: performing a corresponding action according to the control instruction, or carrying out a voice broadcast on the voice response content.

In some embodiments, the control instruction comprises one or more execution instructions for controlling one or more applications to perform one or more operations.

In some embodiments, the control instruction is preset manually by a user of the terminal device or preset automatically by the terminal device or by a server based on a user profile of the user.

In some embodiments, the control instruction comprises a plurality of execution instructions are to be executed in a preset execution sequence.

In some embodiments, the execution sequence of the plurality of execution instructions is preset based on at least one of: a manual configuration by a user of the terminal device; configurations by the terminal device or by a server based on a user profile of the user; or big data obtained by the server.

In some embodiments, wherein at least one of the cached sample sentences or the response content of the cached sample sentences is pre-configured and/or updated based on at least one of: a manual configuration by a user of the terminal device; an initial system configuration; configurations based on a user profile at the terminal device or at a server; or big data obtained by the server.

In some embodiments, the method may further comprise updating the cached sample sentences and the response content of the cached sample sentences according to the input sentence and the first response content of the input sentence.

In some embodiments, the updating the cached sample sentences and the response content of the cached sample sentences according to the input sentence and the first response content of the input sentence further comprises: determining an acquisition frequency of the input sentence; comparing the acquisition frequency of the input sentence to a first preset threshold; and in response to determining that the acquisition frequency of the input sentence is greater than the first preset threshold, updating the cached sample sentences and the first response content of the cached sample sentences according to the input sentence and the first response content of the input sentence.

According to another aspect of the present disclosure, there is provided a terminal device, comprising: a memory storing computer instructions thereon and a processor coupled to the memory. When the processor executes the computer instructions, the processor is configured to: perform voice recognition on collected voice signals to acquire an input sentence; performing semantic matching between the input sentence and cached sample sentences to determine whether there is a sample sentence having the same or similar semantics as the input sentence among the cached sample sentences; in response to determining that there is a sample sentence having the same or similar semantics as the input sentence among the cached sample sentences, acquire cached response content corresponding to the sample sentence having the same or similar semantics as the input sentence as first response content of the input sentence; in response to determining that there is no sample sentence having the same or similar semantics as the input sentence among the cached sample sentences, send at least one of the input sentence or the collected voice signals to a server, and receive transmitted response content of the at least one of the input sentence or the collected voice signals from the server as the first response content of the input sentence, wherein the transmitted response content of the at least one of the input sentence or the collected voice signals from the server is acquired by the server through semantic understanding of the at least one of the input sentence or the collected voice signals according to a knowledge base stored on the server; respond to the input sentence according to the first response content of the input sentence; and update at least one of the cached sample sentences or the response content of the cached sample sentences.

In some embodiments, the first response content of the input sentence further comprises at least one of a control instruction or voice response content. When the processor executes the computer instructions, the processor is further configured to respond to the input sentence according to the first response content of the input sentence by at least one of the following: performing a corresponding action according to the control instruction; or carrying out a voice broadcast on the voice response content.

In some embodiments, the control instruction comprises one or more execution instructions for controlling one or more applications to perform one or more operations.

In some embodiments, the control instruction is preset manually by a user of the terminal device or preset automatically by the terminal device or by a server based on a user profile of the user.

In some embodiments, the control instruction comprises a plurality of execution instructions are to be executed in a preset execution sequence.

In some embodiments, the execution sequence of the plurality of execution instructions is preset based on at least one of: a manual configuration by a user of the terminal device; configurations by the terminal device or by a server based on a user profile of the user; or big data obtained by the server.

In some embodiments, the cached sample sentences and the response content of the cached sample sentences are pre-configured based on at least one of: a manual configuration by a user of the terminal device; an initial system configuration; configurations based on a user profile at the terminal device or at a server; or big data obtained by the server.

In some embodiments, when the processor executes the computer instructions, the processor is further configured to: update at least one of the cached sample sentences or the response content of the cached sample sentences according to the input sentence and the first response content of the input sentence.

In some embodiments, when the processor executes the computer instructions, the processor is further configured to update at least one of the cached sample sentences or the response content of the cached sample sentences according to the input sentence and the first response content of the input sentence by performing the following operations: determining an acquisition frequency of the input sentence; comparing the acquisition frequency of the input sentence to a first preset threshold; and in response to determining that the acquisition frequency of the input sentence is greater than the first preset threshold, updating the cached sample sentences and the response content of the cached sample sentences using the input sentence and the first response content of the input sentence.

According to another aspect of the present disclosure, there is provided a voice interaction system, which comprises a terminal device and a server. The terminal device is configured to: perform voice recognition on collected voice signals to acquire an input sentence, perform semantic matching between the input sentence and cached sample sentences to determine whether there is a sample sentence having the same or similar semantics as the input sentence among the cached sample sentences, in response to determining that there is a sample sentence having the same or similar semantics as the input sentence among the cached sample sentences, acquire cached response content corresponding to the sample sentence having the same or similar semantics as the input sentence as first response content of the input sentence, in response to determining that there is no sample sentence having the same or similar semantics as the input sentence among the cached sample sentences, send at least one of the input sentence or the collected voice signals to a server, and receive transmitted response content of the at least one of the input sentence or the collected voice signals from the server as the first response content of the input sentence, respond to the input sentence according to the first response content of the input sentence, and update at least one of the cached sample sentences or the response content of the cached sample sentences. The server is configured to: receive the at least one of the input sentence or the collected voice signals from the terminal device, and perform semantic understanding of the at least one of the input sentence or the collected voice signals according to a knowledge base stored on the server to acquire the transmitted response content of the at least one of the input sentence or the collected voice signals, and send the transmitted response content of the at least one of the input sentence or the collected voice signals to the terminal device.

According to another aspect of the present disclosure, there is provided a non-transitory computer-readable storage medium having stored thereon a computer program, wherein the program, when executed by a processor, implements the method as described above.

BRIEF DESCRIPTION OF THE DRAWINGS

The embodiments of the present disclosure will be further described in details below with reference to the drawings.

DETAILED DESCRIPTION

In order to illustrate the present disclosure in a clearer manner, the present disclosure is further illustrated below with reference to the preferred embodiments and drawings. Similar components in the drawings are represented by the same reference sign. It shall be understood by those skilled in the art that the contents specifically described below are illustrative instead of limiting, and the scope of protection sought for in the present disclosure shall not be limited thereby.

Figure 1:
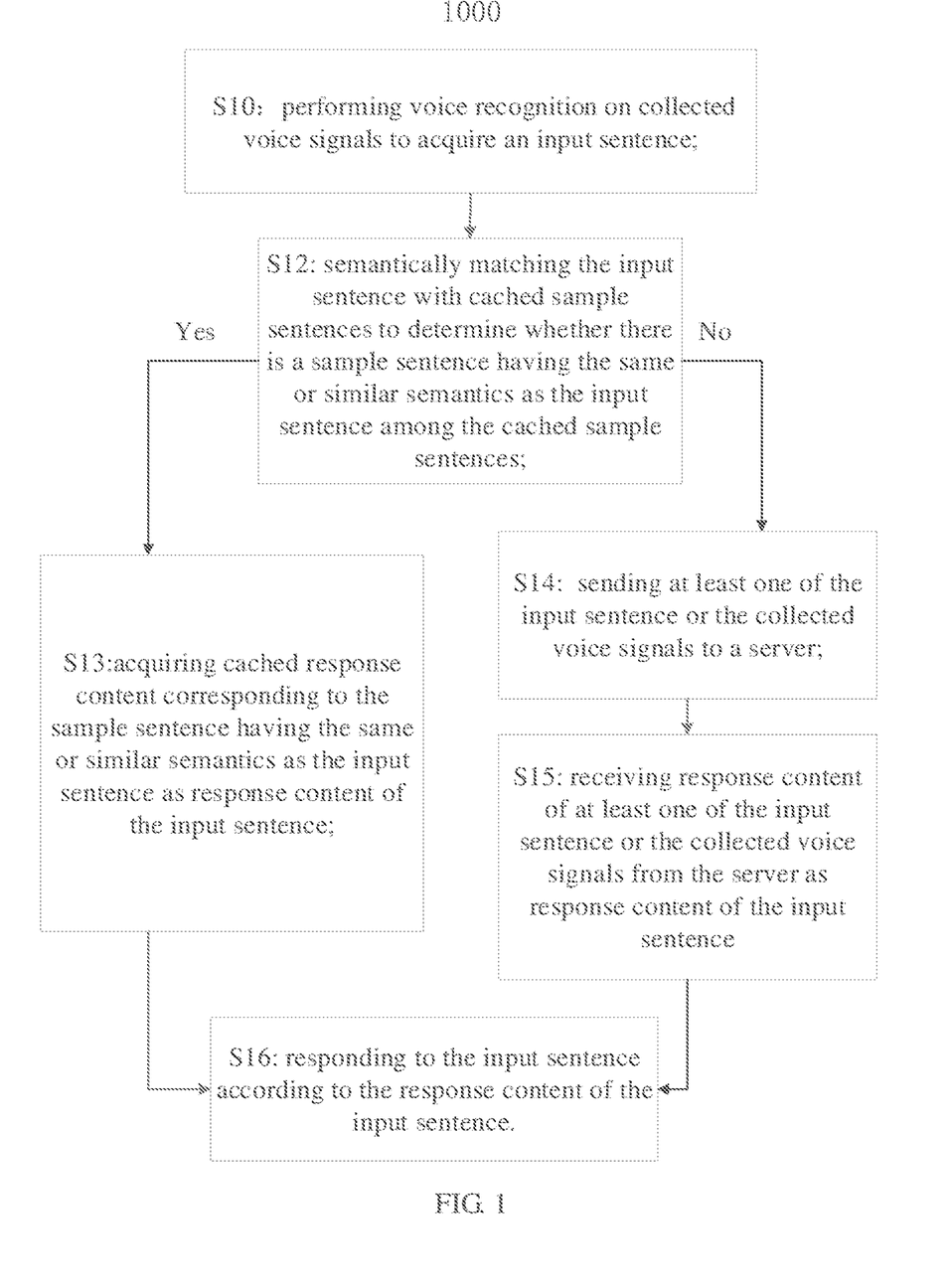
FIG. 1 is a flowchart illustrating a voice interaction method provided in an embodiment of the present disclosure.

FIG. 1 is a flowchart illustrating a voice interaction method 1000 provided in an embodiment of the present disclosure. The method 1000 is performed by a terminal device (e.g., a terminal device 100 in FIG. 3).

As shown in FIG. 1, an embodiment of the present disclosure provides a voice interaction method 1000.

The method 1000 may comprise S10: performing voice recognition on collected voice signals to acquire an input sentence.

The method 1000 may comprise S12: semantically matching the input sentence with cached sample sentences to determine whether there is a sample sentence having the same or similar semantics as the input sentence among the cached sample sentences.

The method 1000 may comprise S13: in response to determining that there is a sample sentence having the same or similar semantics as the input sentence among the cached sample sentences, acquiring cached response content corresponding to the sample sentence having the same or similar semantics as the input sentence as response content of the input sentence.

Semantic matching is one of the fundamental tasks in the field of Natural Language Processing (NLP). The direct goal of semantic matching is to measure textual similarity semantically, and to judge whether two sentences express the same or similar meaning. The semantic matching method adopted is flexibly adjusted according to the application scenarios, including voice command control, information retrieval, question and answering system, repeating questions, dialogue system, machine translation, etc.

According to different ways of content matching, semantic matching can be performed in various ways, including but not limited to exact matching, fuzzy matching, and regular expression matching.

The exact matching refers to a matching method in which the input sentence is exactly the same as a sample sentence in the sample sentence cached by the terminal device.

The fuzzy matching needs to capture semantic similarity information. For example, two texts may have the same semantics, but different expressions. Optionally, the fuzzy matching may automatically split the search term into unit concepts, and perform a logical AND operation, regardless of the position of one or more words in the input sentence, as long as the word appears. Optionally, grammatical information needs to be utilized. When two texts have a good degree of matching, their grammatical information is also related to a certain extent. It is helpful to make full use of grammatical structures instead of just treating sentences as single words. For example, for question and answering systems, questions have similar grammatical structures.

The regular expression matching is a pattern used to match a combination of characters in a string, using a single string to describe and match a series of strings that match a syntactic rule.

According to different types of technical implementation, the semantic matching may comprise literal matching method, topic model, deep semantic matching model, etc.

Traditional literal matching technologies include algorithms such as BoW, VSM, TF-IDF, BM25, Jaccord, SimHash, etc. For example, the BM25 algorithm calculates the matching score between a query field and a network field through the coverage of the query field by the network field. Web Pages with higher scores are better matched to the query. This mainly solves the matching problem at the vocabulary level, or the similarity problem at the vocabulary level.

Topic model methods map a sentence into a low-dimensional continuous space of an equal length, and similarity calculation can be performed on this implicit latent semantic space. Topic model methods comprise e.g., PLSA (Probabilistic Latent Semantic Analysis) and LDA (Latent Dirichlet Allocation). These methods provide concise semantic representation for texts, need convenient operation, and can better make up for the shortcomings of the traditional vocabulary matching methods. However, in terms of effect, these technologies cannot replace the literal matching technologies, and can only be used as an effective supplement to the literal matching.

The deep semantic matching model is implemented by using the deep neural network model technology. For example, based on the Word Embedding trained by the neural network, the text matching calculation can be performed. The training method is simple, and the semantic computability represented by the obtained word vector is further enhanced. Generally speaking, deep text matching models are classified into two types: representational models and interactive models.

Those skilled in the art can understand that any appropriate matching mod may be used with the disclosure herein.

The method 1000 may comprise S14: in response to determining that there is no sample sentence having the same or similar semantics as the input sentence among the cached sample sentences, sending at least one of the input sentence or the collected voice signals to a server.

In some embodiments, only the input sentence is sent to the server. In some embodiments, only the collected voice signals are sent to the server. In some embodiments, both the input sentence and the collected voice signals are sent to the server.

The method 1000 may comprise S15: receiving response content of at least one of the input sentence or the collected voice signals from the server as the response content of the input sentence, wherein the response content of the at least one of the input sentence or the collected voice signals is acquired by the server through semantic understanding of the at least one of the input sentence or the collected voice signals according to a knowledge base stored on the server.

The method 1000 may comprise S16: responding to the input sentence according to the response content of the input sentence.

In some embodiments, the input sentence and the first response content of the input sentence are pre-configured based on at least one of: a manual configuration by a user of the terminal device; an initial system configuration; configurations based on a user profile at the terminal device or at a server; or big data obtained by the server.

The sample sentences and/or corresponding response contents cached by the terminal device can be customized/updated by the user so as to set the sample sentences and corresponding operations. The sample sentences and/or corresponding response contents cached by the terminal device can be initially configured/updated by the system of the terminal device. The sample sentences and corresponding response contents cached by the terminal device can be automatically set by the terminal device or the server according to the user's profile including the user's preferences, habits, usage history etc. The sample sentences and/or corresponding response contents cached by the terminal device can be automatically configured/updated by the server according to the big data of the server-side statistics.

In some optional implementation manners of the present embodiment, the response content further includes at least one of a control instruction or voice response content.

In some embodiments, Step S16 may further comprise at least one of the following: performing, by the terminal device, a corresponding action according to the control instruction, or carrying out, by the terminal device, a voice broadcast on the voice response content.

For example, the control instruction may trigger automatically activating or deactivating one or more applications on the terminal device to perform one or more corresponding operations, or automatically adjusting one or more system setting operation of the terminal device. The control instruction may comprise one or more execution instructions for controlling one or more applications to perform one or more operations. The control instruction and/or the execution instructions may be preset manually by a user of the terminal device, or preset automatically by the terminal device or by a server based on a user profile of the user. In some embodiments, there may be a desired sequence for the execution of multiple operations. The control instruction may comprise a plurality of execution instructions to be executed in a preset execution sequence. In such a case, the execution sequence may be set by a user, or the execution sequence may be controlled by the terminal device or the server. The execution sequence may be set based on at least one of: a manual configuration by a user of the terminal device; configurations by the terminal device or by a server based on a user profile of the user; or big data obtained by the server. In some other embodiments, there may be no sequence between the execution of multiple operations, for example, they may be executed simultaneously, or the execution sequence may be randomly arranged, or the execution sequence may be arranged according to actual needs.

For example, the user may preconfigure a sample sentence "off work" and a route recommendation control instruction corresponding to the sample sentence "off work". After the user speaks the voice command of "off work", i.e., the terminal receives the related voice signals, the terminal device performs voice recognition to obtain the input sentence, and performs semantic matching with the cached sample sentence "off work". After successful matching, as the response content of the input sentence, the route recommendation control instruction is executed, and e.g., a map application is automatically activated to recommend several alternative routes home for the user. In some embodiments, the information of the recommended routes may be broadcast to the user by voice.

For another example, the user may preconfigure a sample sentence "off work" and a corresponding command to disconnect the wireless network. After the user speaks the voice command of "off work", as a response content to the input sentence, the command to disconnect the wireless network may trigger the terminal device to automatically turn off the wireless network switch, and broadcast "the voice command has been executed" by voice. This can save the power consumption of the terminal device for the user after off work.

For another example, the user may preconfigure a sample sentence "off work" and a corresponding control instruction for first disconnecting the wireless network and then recommending the routes. After the user speaks the voice command of "off work", as a response content to the input sentence, the corresponding control instruction may trigger the terminal device first to automatically turns off the wireless network switch, to automatically activate the map application, to recommend several routes for the user to go home, to broadcast the information of each route by voice, and then to broadcast "the voice command has been executed" by voice.

In some optional implementation manners of the present embodiment, the server is a cloud server.

The voice interaction method provided in the present embodiment can dramatically reduce the processing pressure of the server, reduce the cost of the server and improve the response speed of voice interaction without excessively increasing the requirements for the processing performance and the storage space of the terminal device, and is particularly suitable for situations where a server or a server cluster consisting of a limited number of servers provides voice interaction service for a large number of terminal devices at the same time. In addition, the cache mechanism of the sample sentences and the response content thereof adopted by the terminal device is easy to manage and can be flexibly configured.

In addition, compared with the solution provided in the present embodiment, on one hand, if the knowledge base including sample sentences and the response content thereof and various related information is completely delivered to the terminal device and the terminal device executes the semantic understanding algorithm, although the processing pressure of the server can be reduced and the cost of the server can be reduced, the requirements for the storage space and processing performance of the terminal device are higher, and moreover, the response speed of voice interaction cannot be effectively improved; on the other hand, if semantic matching is only performed on the terminal device, and if the sample sentence with the highest similarity is used as a similar sample sentence even in the case where there is no same or similar sample sentence, and the response content of the input sentence is acquired according to the sample sentence with the highest similarity, it is difficult to ensure the accuracy of voice interaction.

In summary, in the voice interaction method provided in the present embodiment, the terminal device caches a plurality of sample sentences and the response content thereof (rather than a knowledge base) occupying less storage space; after the input sentence is acquired through voice recognition, semantic matching, which is simple and fast relative to voice understanding, is performed locally on the terminal device to accurately acquire the response content, and if the semantic matching is unsuccessful, the input sentence is sent to the server for voice understanding to accurately acquire the response content. The method is a solution for realizing voice interaction through terminal-cloud cooperation, can give consideration to the aspects of accuracy, efficiency (response speed), implementation cost and the like of voice interaction, and has obvious advantages compared with existing voice interaction solutions.

Figure 2:
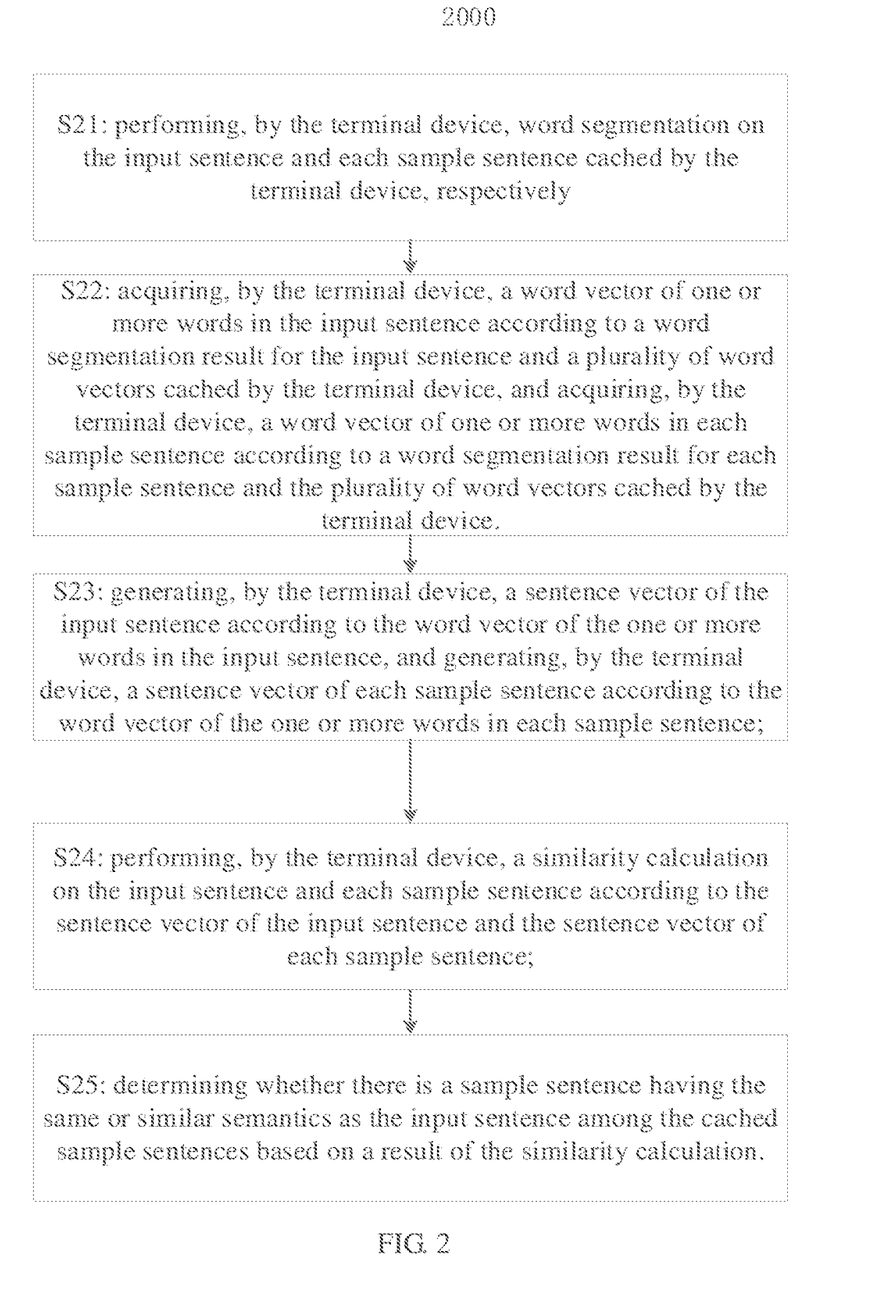
FIG. 2 is a flowchart illustrating a semantic matching method provided in an embodiment of the present disclosure.

FIG. 2 is a flowchart illustrating a semantic matching method 2000 provided in an embodiment of the present disclosure.

In some optional implementation manners of the present embodiment, as shown in FIG. 2, the method 2000 comprises:

S21: performing, by the terminal device, word segmentation on the input sentence and each sample sentence cached by the terminal device, respectively;

S22: acquiring, by the terminal device, a word vector of one or more words in the input sentence according to a word segmentation result for the input sentence and a plurality of word vectors cached by the terminal device, and acquiring, by the terminal device, a word vector of one or more words in each sample sentence according to a word segmentation result for each sample sentence and the plurality of word vectors cached by the terminal device.

S23: generating, by the terminal device, a sentence vector of the input sentence according to the word vector of the one or more words in the input sentence, and generating, by the terminal device, a sentence vector of each sample sentence according to the word vector of the one or more words in each sample sentence;

S24: performing, by the terminal device, a similarity calculation on the input sentence and each sample sentence according to the sentence vector of the input sentence and the sentence vector of each sample sentence; and S25: determining whether there is a sample sentence having the same or similar semantics as the input sentence among the cached sample sentences based on a result of the similarity calculation.

By adopting this implementation manner, through the plurality of word vectors cached in the terminal device, it is possible to reduce calculation resources consumed in the semantic matching process, save the processing capability of the terminal device, and improve the semantic matching speed, without excessively occupying the storage space of the terminal device.

In some optional implementation manners of the present embodiment, the generating, by the terminal device, the sentence vector of the input sentence according to the word vector of the one or more words in the input sentence, and generating, by the terminal device, the sentence vector of the sample sentence according to the word vector of the one or more words in each sample sentence further comprises: encoding, by the terminal device, the word vector of the one or more words in the input sentence and encoding, by the terminal device, the word vector of the one or more words in each sample sentence using a neural network, so as to generate the sentence vector of the input sentence and the sentence vector of each sample sentence.

By adopting this optional manner, the accuracy of the generated sentence vector of the input sentence and the generated sentence vector of the sample sentence can be improved without excessively increasing the requirements for the processing performance of the terminal device, so that the precision of semantic matching is improved.

In one specific example, the terminal device caches a plurality of word vectors. For example, the plurality of word vectors cached by the terminal device are cached as follows: the server extracts word vectors of some frequently used words to generate word vector data after performing word vector model training, and then sends at least part of the word vector data to the terminal device for caching according to the cache capacity of the terminal device itself. When the terminal device finds that a word vector of a certain word in the input sentence does not exist in the cache, it can send a word vector acquisition request carrying information of the word to the server, so that the server sends the word vector of the word to the terminal device, and the terminal device updates the cached word vectors according to the received word vector of the word.

When the terminal device respectively performs word segmentation on the input sentence and the sample sentences cached by the terminal device, the word segmentation can be realized by using various existing word segmentation tools, and the word segmentation can also be realized by a word segmentation program programmed based on existing word segmentation algorithms.

When the terminal device generates the sentence vector of the input sentence according to the word vector(s) of the one or more words in the input sentence and generates the sentence vector of the sample sentence according to the word vector of the one or more words in the sample sentence, a deep learning method is used for conversion. In the method, a simple neural network is used to encode a word vector sequence into a sentence vector. It needs to be noted that the model corresponding to the encoding performed using the neural network should be substantially consistent with the semantic understanding model generated by the server by training, so as to ensure the consistency and accuracy of response content acquisition. In addition, for a terminal device with low processing performance such as a low-end electronic product, the sentence vector can also be generated by using a simple method of word vector addition; this method requires low processing performance for processing and has a high processing speed, and in cooperation with setting a higher similarity threshold when performing a similarity calculation, the accuracy of the similarity calculation can also be ensured.

When the terminal device performs a similarity calculation on the input sentence and the sample sentence according to the sentence vector of the input sentence and the sentence vector of the sample sentence, the similarity calculation can be performed by using a calculation method based on cosine distance, Euclidean distance, Mahalanobis distance and the like. Taking the cosine distance as an example, the specific formula for calculating a distance between a vector A of the input sentence and a vector B of the sample sentence is as follows:

$$\cos\theta = \frac{\sum_{i=1}^{n}(A_i \times B_i)}{\sqrt{\sum_{i=1}^{n}(A_i)^2} \times \sqrt{\sum_{i=1}^{n}(B_i)^2}}$$

wherein, the value range of similarity value is between 0 and 1, and a similarity threshold can be set. If the similarity value between the input sentence and a certain sample sentence is greater than the similarity threshold, the two sentences are considered to be at least similar (namely same or similar), and then it can be determined that there is a sample sentence having the same or similar semantics as the input sentence among the cached sample sentences according to the matching result, so that the response content corresponding to the input sentence can be directly acquired from the cache of the terminal device. If there is no sample sentence a similarity value between which and the input sentence is greater than the similarity threshold, at least one of the input sentence or the collected voice signals is sent to the server for semantic understanding.

In some optional implementation manners of the present embodiment, the method further includes: updating, by the server, the knowledge base according to the received input sentence and the acquired response content of the input sentence.

By adopting this implementation manner, the server can update the knowledge base according to the received input sentence, which is advantageous for the expansion of the content of the knowledge base and the improvement of the response speed of subsequent voice interactions.

In the present embodiment, the manner of updating the sample sentences and the response content thereof cached by the terminal device may be local update or remote update, and the two update manners of local update and remote update can be used simultaneously, wherein the two update manners of local update and remote update are specifically as follows:

Local Update

In some optional implementation manners of the present embodiment, the method further includes: updating, by the terminal device, the cached sample sentences and the response content of the cached sample sentences according to the input sentence and the response content of the input sentence, that is, the input sentence used as a sample sentence and the response content of the input sentence are added to the cache content.

By adopting this implementation manner, the local update of the cache content performed by the terminal device according to the input sentence can be realized, which is beneficial to improve the response speed of subsequent voice interactions in a targeted manner.

In a specific example, if the response content is voice response content and the voice response content is acquired from the server, the terminal device caches the input sentence and its voice response content (audio files in formats of mp3, way, and the like), while carrying out a voice broadcast of the voice response content.

In some optional implementation manners of the present embodiment, the updating the cached sample sentences and the response content thereof by the terminal device according to the input sentence and the response content thereof further comprises: determining, by the terminal device, an acquisition frequency of the input sentence, and updating, by the terminal device, the cached sample sentences and the response content thereof using the input sentence with the acquisition frequency greater than a first preset threshold (such as a frequency threshold) and the response content thereof. The first preset threshold may be any natural number representing an acquisition frequency set according to needs, for example, the first preset threshold may be 5 times.

For example, the updating the cached sample sentences and the response content thereof according to the input sentence and the response content thereof further comprises: determining an acquisition frequency of the input sentence, comparing the acquisition frequency of the input sentence to the first preset threshold, and in response to determining that the acquisition frequency of the input sentence is greater than the first preset threshold, updating the cached sample sentences and the response content thereof using the input sentence and the response content thereof.

Wherein, the acquisition frequency of the input sentence is equal to a collection frequency of voice signals corresponding to the input sentence, which can reflect the popularity of the input sentence, and the terminal device can acquire frequently used sentences by counting and sorting acquisition frequencies of input sentences.

By adopting this implementation manner, it is possible to realize the local update of the cache content by the terminal device according to input sentences with high acquisition frequencies, which is more beneficial to improve the response speed of subsequent voice interactions in a targeted manner.

Further, in some optional implementation manners of the present embodiment, the updating the cached sample sentences and the response content thereof by the terminal device according to the input sentence with the acquisition frequency greater than the first preset threshold and the response content thereof further comprises: determining a cache capacity by the terminal device; if the cache capacity is less than a second preset threshold (for example, a cache capacity threshold), updating, by the terminal device, the cached sample sentences and the response content thereof according to a result of comparison between the acquisition frequency of the input sentence with the acquisition frequency greater than the first preset threshold and an acquisition frequency of a cached sample sentence with the minimum acquisition frequency.

For example, the updating the cached sample sentences and the response content thereof with the input sentence and the response content thereof in response to determining that the acquisition frequency of the input sentence is greater than the first preset threshold may comprise: comparing the cache capacity of the terminal device to the second preset threshold; in response to that the cache capacity of the terminal device is less than the second preset threshold, comparing the acquisition frequency of the input sentence to the acquisition frequency of the cached sample sentence with the minimum acquisition frequency; and in response to determining that the acquisition frequency of the input sentence is greater than the acquisition frequency of the cached sample sentence with the minimum acquisition frequency, updating the cached sample sentences and the response content thereof by using the input sentence and the response content thereof to replace the cached sample sentence with the minimum acquisition frequency. The second preset threshold may be any value representing a cache capacity set according to needs, for example, 10M bytes.

Wherein, the terminal device can also cache records of the acquisition frequencies of the input sentence and the sample sentences, and the acquisition frequencies of the input sentence and the sample sentences can be acquired based on the records when comparing the acquisition frequency of the input sentence to that of the sample sentences.

By adopting this implementation manner, it can be ensured that the cache capacity occupied by the cached sample sentences and the response content thereof is managed and controlled, and it can be ensured that the implementation of voice interaction does not occupy excessive storage space of the terminal device.

In a specific example, for example, it is supposed that when the cache capacity is less than the second preset threshold, the number of entries of the cached sample sentences and the response content thereof to be updated needs to be kept unchanged, that is, the cache capacity of the terminal device occupied by the cached sample sentences and the response content thereof to be updated cannot be increased any more in this case. It is determined whether the acquisition frequency of the input sentence is greater than the acquisition frequency of the cached sample sentence with the minimum acquisition frequency: if yes, the cached sample sentence with the minimum acquisition frequency and the response content thereof (also including the record of the acquisition frequency) are deleted, and the input sentence and the response content thereof (also including the record of the acquisition frequency) are added to the cache, so as to realize updating the cache and keeping the number of entries of the cached sample sentences and the response content thereof unchanged; if not, the cache is not updated.

Remote Update

In some optional implementation manners of the present embodiment, the method further comprises:

sending, by the terminal devices, update request messages carrying cache capacity information of the terminal devices themselves to the server, wherein the terminal devices may periodically send the update request messages, may send the update request messages in response to user operations, or may send the update request messages when specific events occur, where the specific event refers to, for example, the start-up of a terminal device, etc.;

generating, by the server, cache update data according to cache capacity information of the terminal devices themselves carried by the update request messages and acquisition frequencies of respective sample sentences in the knowledge base, and sending, by the server, the cache update data to corresponding terminal devices, wherein: the server stores received input sentences as sample sentences in the knowledge base, so the acquisition frequencies of the sample sentences are equal to the acquisition frequencies of the input sentences received by the server and can reflect the popularity thereof; the server may acquire frequently used sentences by counting and sorting the receiving frequencies of the received input sentences, and the server can calculate the receiving frequencies of the input sentences according to input sentence records sent by each terminal device or input sentence records sent by a group of terminal devices (e.g. terminal devices of the same type);

updating, by the terminal devices, the cached sample sentences and the response content thereof according to the cache update data.

By adopting this implementation manner, it is possible to realize the remote update of the cache content of the terminal devices by the server, which facilitates the server to synthesize input sentences acquired by a plurality of terminals to update the cache content of the terminal devices, and can improve the response speed of subsequent voice interactions.

In addition to the above implementation manners, in some optional implementation manners of the present embodiment, the method further comprises:

sending, by the server, an update inquiry message to the terminal devices, wherein the server may periodically send the update inquiry message, or may send the update inquiry message when detecting a specific event, where the specific event refers to, for example, the start-up of a certain terminal device (when a terminal device is shut down, it is disconnected from the server, and when the terminal device re-establishes a connection with the server, the server determines that it is started up);

sending, by the terminal devices, update confirmation messages carrying cache capacity information of the terminal devices themselves to the server, wherein the terminal devices may present the update inquiry message after receiving the update inquiry messages, and send the update confirmation messages carrying the cache capacity information of the terminal devices themselves to the server in response to user confirmation operations.

generating, by the server, cache update data according to the cache capacity information of the terminal devices themselves carried by the update confirmation messages and acquisition frequencies of respective sample sentences in the knowledge base, and sending, by the server, the cache update data to corresponding terminal devices; and updating, by the terminal devices, the cached sample sentences and the response content thereof according to the cache update data.

Figure 3:
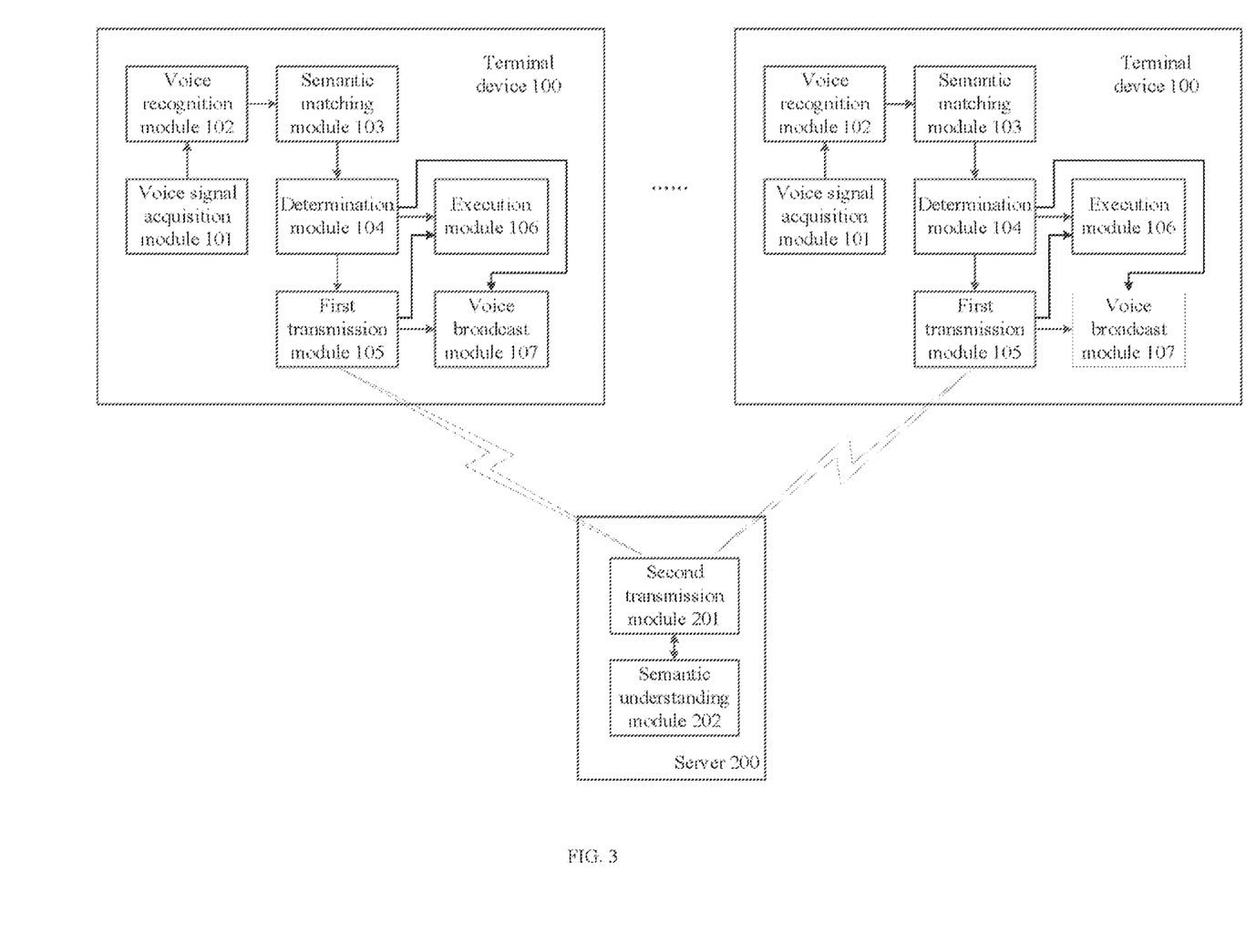
FIG. 3 is a schematic diagram illustrating a voice interaction system provided in an embodiment of the present disclosure.

FIG. 3 is a schematic diagram illustrating a voice interaction system provided in an embodiment of the present disclosure.

As shown in FIG. 3, the voice interaction system comprises a server 200 and at least one terminal device 100.

The server 200 and the at least one terminal device 100 may each comprise one or more modules. These modules may be implemented in hardware, software, firmware, or any combination thereof. One or more of these modules may be integrated together, and some of these modules may include smaller modules. Thus, FIG. 3 is merely an exemplary illustration of the composition and functionality of the modules in the server 200 and the at least one terminal device 100. Those skilled in the art can make various variations without departing from the teaching of the present disclosure.

The terminal device 100 locally caches a plurality of sample sentences and the response content thereof. The terminal device 100 may comprise, for example, a voice recognition module 102, a semantic matching module 103, a determination module 104, and a first transmission module 105.

The server 200 comprises a second transmission module 201 and a semantic understanding module 202.

The voice recognition module 102 is configured to perform voice recognition on collected voice signals to acquire an input sentence, wherein the input sentence may be an input sentence in the form of a string of characters; it is understood that the terminal device 100 further comprises an internal or external voice signal acquisition module 101 (such as a microphone, etc.) for collecting voice signals.

The semantic matching module 103 is configured to perform semantic matching between the input sentence and a sample sentence to obtain a matching result, which is used to determine whether there is a sample sentence having the same or similar semantics as the input sentence among the cached sample sentences.

The determination module 104 is configured to determine whether there is a sample sentence having the same or similar semantics as the input sentence in the cached sample sentences: if yes, response content, cached by the terminal device 100, corresponding to the sample sentence having the same or similar semantics as the input sentence is used as response content of the input sentence; if not, at least one of the input sentence or the collected voice signals is sent to the server 200 through the first transmission module 105.

The semantic understanding module 202 is configured to perform semantic understanding on the at least one of the input sentence or the collected voice signals received by the second transmission module 201 according to a knowledge base stored on the server 200, and acquire response content of the at least one of the input sentence or the collected voice signals, and send the response content of the at least one of the input sentence or the collected voice signals to the terminal device 100 through the second transmission module 201, wherein the knowledge base is a semantic understanding knowledge base including sample sentences and the response content thereof and various related information, and the knowledge base can be stored in a database of the server 200. The semantic understanding module 202 may perform semantic understanding of the at least one of the input sentence or the collected voice signals according to the content included in the knowledge base based on a semantic understanding model generated by training using existing semantic understanding algorithms, so as to acquire the response content of the at least one of the input sentence or the collected voice signals. In addition, the server 200 can continuously train and update the semantic understanding model to ensure the accuracy rate and the like of the semantic understanding.

In a case that the terminal device 100 sends only the input sentence to the server, the semantic understanding module 202 may perform semantic understanding based on the input sentence to get the response content of the input sentence.

In a case that the terminal device 100 sends only the collected voice signals to the server, the semantic understanding module 202 may perform semantic understanding based on the collected voice signals to get the response content of the collected voice signals, and send the response content of the collected voice signals to the terminal device 100, the terminal device 100 takes the received response content of the collected voice signals as the response content of the input sentence.

In a case that the terminal device 100 sends both the input sentence and the collected voice signals to the server, the semantic understanding module 202 may perform semantic understanding based on both the input sentence and the collected voice signals to get the response content of the input sentence and the collected voice signals, and send the response content of the input sentence and the collected voice signals to the terminal device 100, the terminal device 100 takes the received response content of the input sentence and the collected voice signals as the response content of the input sentence.

The terminal device 100 is configured to respond to the input sentence according to the response content of the input sentence.

Wherein, the terminal device 100 may be various electronic devices, including but not limited to a personal computer, a smart phone, a smart watch, a tablet computer, a personal digital assistant, a smart player, a vehicle-mounted terminal, an electronic picture screen, etc. The terminal device 100 communicates with the server 200 via a network, and the network may include various connection types, such as wired or wireless communication links, or fiber optic cables, etc. In a specific example, communication is performed between the terminal device 100 and the server 200 through a communication link established between the first transmission module 105 and the second transmission module 201.

The voice interaction system provided in the present embodiment can reduce the processing pressure of the server, reduce the cost of the server and improve the response speed of voice interaction without excessively increasing the requirements for the processing performance and storage space of the terminal device, or in the case where the current terminal device can meet the storage space and processing performance requirements for the terminal device. The system is particularly suitable for situations where a server or a server cluster consisting of a limited number of servers provides voice interaction service for a large number of terminal devices at the same time. In addition, the cache mechanism of the sample sentences and the response content thereof is easy to manage and can be flexibly configured.

In addition, compared with the solution provided in the present embodiment, on one hand, if the knowledge base including sample sentences and the response content thereof and various related information is completely delivered to the terminal device and the terminal device executes the semantic understanding algorithm, although the processing pressure of the server can be reduced and the cost of the server can be reduced, the requirements for the storage space and processing performance of the terminal device are higher, and moreover, the response speed of voice interaction cannot be effectively improved; on the other hand, if semantic matching is only performed on the terminal device, and if the sample sentence with the highest similarity is also used as a similar sample sentence in the case where there is no same or similar sample sentence and the response content of the input sentence is acquired according to the sample sentence with the highest similarity, it is difficult to ensure the accuracy of voice interaction.

In summary, in the voice interaction system provided in the present embodiment, the terminal device caches a plurality of sample sentences and response content thereof (rather than a knowledge base) occupying less storage space; after the input sentence is acquired through voice recognition, semantic matching, that is simple and fast relative to voice understanding, is performed locally on the terminal device to accurately acquire the response content, and if the semantic matching is unsuccessful, at least one of the input sentence or the collected voice signals is sent to the server for voice understanding to accurately acquire the response content. The method is a solution for realizing voice interaction through terminal-cloud cooperation, can give consideration to the aspects of accuracy, efficiency (response speed), implementation cost and the like of voice interaction, and has obvious advantages compared with existing voice interaction solutions.

In some optional implementation manners of the present embodiment, the response content further includes at least one of a control instruction or voice response content. The terminal device 100 further comprises an execution module 106 for executing a corresponding action according to the control instruction and/or a voice broadcast module 107 for carrying out a voice broadcast on the voice response content.

In some optional implementation manners of the present embodiment, the server 200 is a cloud server.

In some optional implementation manners of the present embodiment, the terminal device 100 caches a plurality of word vectors.

The semantic matching module 103 further comprises:

a word segmentation module configured to perform word segmentation on the input sentence and each of sample sentences cached by the terminal device 100;

a word vector acquisition module configured to acquire a word vector of one or more words in the input sentence according to a word segmentation result for the input sentence and word vectors cached by the terminal device 100, and acquires a word vector of one or more words in each sample sentence according to a word segmentation result for each sample sentence and word vectors cached by the terminal device 100.

a sentence vector generation module configured to generate a sentence vector of the input sentence according to the word vector of the one or more words in the input sentence, and generate a sentence vector of each sample sentence according to the word vector of the one or more words in each sample sentence; and a similarity calculation module configured to perform a similarity calculation on the input sentence and each sample sentence according to the sentence vector of the input sentence and the sentence vector of each sample sentence, to acquire a matching result.

By adopting this implementation manner, through the plurality of word vectors cached in the terminal device 100, it is possible to reduce calculation resources consumed in the semantic matching process, save the processing capability of the terminal device 100, and improve the speed of semantic matching, without excessively occupying the storage space of the terminal device.

In some optional implementation manners of the present embodiment, the sentence vector generation module is further configured to encode the word vector of the one or more words in the input sentence and encode the word vector of the one or more words in each sample sentence using a neural network, so as to generate the sentence vector of the input sentence and the sentence vector of each sample sentence.

By adopting this implementation manner, the accuracy of the generated sentence vector of the input sentence and the generated sentence vectors of the sample sentences can be improved without excessively increasing the requirements for the processing performance of the terminal device 100, so that the precision of semantic matching is improved.

In a specific example, the plurality of word vectors cached by the terminal device 100 are cached as follows: the server 200 extracts word vectors of some frequently used words to generate word vector data after performing word vector model training, and then sends at least part of the word vector data to the terminal device 100 for caching according to the cache capacity of the terminal device 100 itself. When the word vector acquisition module finds that a word vector of a certain word in the input sentence does not exist in the cache, it can send a word vector acquisition request carrying information of the word to the server 200, so that the server 200 sends the word vector of the word to the terminal device 100, and the terminal device 100 updates the cached word vectors according to the received word vector of the word.

The word segmentation module can realize word segmentation by using various existing word segmentation tools, and can also realize word segmentation by a word segmentation program programmed based on existing word segmentation algorithms.

The sentence vector generation module performs conversion using a deep learning method in which a simple neural network is used to encode a word vector sequence into a sentence vector. It needs to be noted that the model corresponding to the encoding performed using the neural network should be substantially consistent with the semantic understanding model generated by the server 200 by training, so as to ensure the consistency and accuracy of response content acquisition. In addition, for the terminal device 100 with low processing performance such as a low-end electronic product, the sentence vector generation module can also generate a sentence vector by using a simple method of word vector addition; this method requires low processing performance for processing and has a high processing speed, and in cooperation with setting a higher similarity threshold when performing a similarity calculation, the accuracy of the similarity calculation can also be ensured.

The similarity calculation module can also perform a similarity calculation by using a calculation method based on cosine distance, Euclidean distance, Mahalanobis distance and the like. Taking the cosine distance as an example, the specific formula for calculating a distance between a vector A of the input sentence and a vector B of a sample sentence is as follows:

$$\cos\theta = \frac{\sum_{i=1}^{n}(A_i \times B_i)}{\sqrt{\sum_{i=1}^{n}(A_i)^2} \times \sqrt{\sum_{i=1}^{n}(B_i)^2}}$$

wherein, the value range of similarity value is between 0 and 1, and a similarity threshold can be set. If the similarity value between the input sentence and a certain sample sentence is greater than the similarity threshold, the two sentences are considered to be at least similar (namely same or similar), and then the determination module can determine that there is a sample sentence having the same or similar semantics as the input sentence among the cached sample sentences according to the matching result, so that the response content corresponding to the input sentence can be directly acquired from the cache of the terminal device 100. If there is no sample sentence a similarity value between which and the input sentence is greater than the similarity threshold, the determination module sends at least one of the input sentence or the collected voice signals to the server 200 for semantic understanding through the first transmission module 105.

In some optional implementation manners of the present embodiment, the server 200 is configured to update the knowledge base according to the input sentence received by the second transmission module 201 and the acquired response content of the input sentence.

By adopting this implementation manner, the server 200 can update the knowledge base according to the received input sentence, which is advantageous for the expansion of the content of the knowledge base and the improvement of the response speed of subsequent voice interactions.

In the present embodiment, the manner of updating of the sample sentences and the response content thereof cached by the terminal device 100 may be local update or remote update, and the two update manners of local update and remote update can be used simultaneously, wherein the two update manners of local update and remote update are specifically as follows:

Local Update

In some optional implementation manners of the present embodiment, the terminal device 100 is further configured to: update the cached sample sentences and the response content thereof according to the input sentence and the response content thereof, that is, the input sentence used as a sample sentence and the response content thereof are added to the cache content.

By adopting this implementation manner, the local update of the cache content performed by the terminal device 100 according to the input sentence can be realized, which is beneficial to improve the response speed of subsequent voice interactions in a targeted manner.

In a specific example, if the response content is voice response content and the voice response content is acquired from the server 200, the terminal device 100 caches the input sentence and its voice response content (audio files in formats of mp3, way, and the like), while carrying out a voice broadcast of the voice response content by the voice broadcast module 107.

Further, in some optional implementation manners of the present embodiment, the terminal device 100 is further configured to determine an acquisition frequency of the input sentence, and update the cached sample sentences and/or the response content thereof according to the input sentence with the acquisition frequency greater than a first preset threshold (an acquisition frequency threshold) and the response content thereof.

Wherein, the acquisition frequency of the input sentence is equal to a collection frequency of voice signals corresponding to the input sentence, which can reflect the popularity of the input sentence, and the terminal device 100 can acquire frequently used sentences by counting and sorting acquisition frequencies of input sentences.

By adopting this implementation manner, it is possible to realize the local update of the cache content performed by the terminal device 100 according to input sentences with high acquisition frequencies, which is more beneficial to improve the response speed of subsequent voice interactions in a targeted manner.

Further, in some optional implementation manners of the present embodiment, the terminal device 100 is further configured to determine a cache capacity when updating the cached sample sentences and the response content thereof according to the input sentence with the acquisition frequency greater than the first preset threshold and the response content thereof, and if the cache capacity is less than a second preset threshold (cache capacity threshold), the cached sample sentences and the response content thereof are updated according to a result of comparison between the acquisition frequency of the input sentence and an acquisition frequency of a cached sample sentence with the minimum acquisition frequency.

Wherein, the terminal device 100 can also cache records of the acquisition frequencies of the input sentence and the sample sentence, and when comparing the acquisition frequency of the input sentence to that of the sample sentence, the acquisition frequencies of the input sentence and the sample sentence can be acquired based on the records.

By adopting this implementation manner, it can be ensured that the cache capacity occupied by the cached sample sentences and the response content thereof is managed and controlled, and it can be ensured that the implementation of voice interaction does not occupy excessive storage space of the terminal device 100.

In a specific example, for example, it is supposed that when the cache capacity is less than the second preset threshold, the number of entries of the cached sample sentences and the response content thereof to be updated needs to be kept unchanged, that is, the cache capacity of the terminal device 100 occupied by the cached sample sentences and the response content thereof to be updated cannot be increased any more in this case. It is determined whether the acquisition frequency of the input sentence is greater than the acquisition frequency of the cached sample sentence with the minimum acquisition frequency: if yes, the cached sample sentence with the minimum acquisition frequency and the response content thereof (also including the record of the acquisition frequency) are deleted, and the input sentence and the response content thereof (also including the record of the acquisition frequency) are added to the cache, so as to realize updating the cache and keeping the number of entries of the cached sample sentences and the response content thereof unchanged; if not, the cache is not updated.

Remote Update

In some optional implementation manners of the present embodiment, the terminal devices 100 are further configured to send update request messages carrying cache capacity information of the terminal devices 100 themselves to the server 200, wherein the terminal devices 100 may be configured to periodically send the update request messages, send the update request messages in response to user operations, or send the update request messages when specific events occur, where the specific event refers to, for example, the start-up of a terminal device 100, etc.

The server 200 is further configured to generate cache update data according to the cache capacity information of the terminal devices 100 themselves carried by the update request messages and acquisition frequencies of respective sample sentences in the knowledge base, and send the cache update data to corresponding terminal devices 100; wherein, the server 200 stores received input sentences as sample sentences in the knowledge base, so the acquisition frequencies of the sample sentences are equal to the acquisition frequencies of the input sentences received by the server 200 and can reflect the popularity thereof; the server 200 may identify frequently used sentences by counting and sorting the receiving frequencies of the received input sentences; in addition, the server 200 can calculate the receiving frequencies of the input sentences according to input sentence records sent by each terminal device or input sentence record sent by a group of terminal devices (e.g. terminal devices 100 of the same type).

The terminal devices 100 are further configured to update the cached sample sentences and/or the response content thereof according to the cache update data.

wherein, the sample sentences initially cached by the terminal devices 100 and the response content thereof can be cached as follows: the server 200 generates initial cache data according to the cache capacity information of the terminal devices 100 themselves carried by the update request messages and acquisition frequencies of respective sample sentences in the knowledge base, and sends the initial cache data to corresponding terminal devices 100; and the terminal devices 100 initialize the cached sample sentences and the response content thereof according to the initial cache data.

By adopting this implementation manner, it is possible to realize the remote update of the cache content of the terminal devices 100 by the server 200, which facilitates the server 200 to synthesize input sentences acquired by a plurality of terminals to update the cache content of the terminal devices 100, and can improve the response speed of subsequent voice interactions.

In addition to the above implementation manners, in some optional implementation manners of the present embodiment, the server 200 is further configured to send an update inquiry message to the terminal devices 100; wherein, the server 200 can be configured to periodically send the update inquiry message, or send the update inquiry message when detecting a specific event, where the specific event refers to, for example, the start-up of a certain terminal device 100 (when a terminal device 100 is shut down, it is disconnected from the server 200, and when the terminal device 100 re-establishes a connection with the server 200, the server 200 determines that it is started up).

The terminal devices 100 are further configured to send update confirmation messages carrying cache capacity information of the terminal devices 100 themselves to the server 200 according to the update inquiry message; wherein, the terminal devices 100 can be configured to present the update inquiry message after receiving the update inquiry message, and send the update confirmation messages carrying the cache capacity information of the terminal devices 100 themselves to the server 200 in response to user confirmation operations.

The server 200 is further configured to generate cache update data according to the cache capacity information of the terminal devices 100 themselves carried by the update confirmation messages and acquisition frequencies of respective sample sentences in the knowledge base, and send the cache update data to corresponding terminal devices 100.

The terminal devices 100 are further configured to update the cached sample sentences and/or the response content thereof according to the cache update data.

Figure 4:
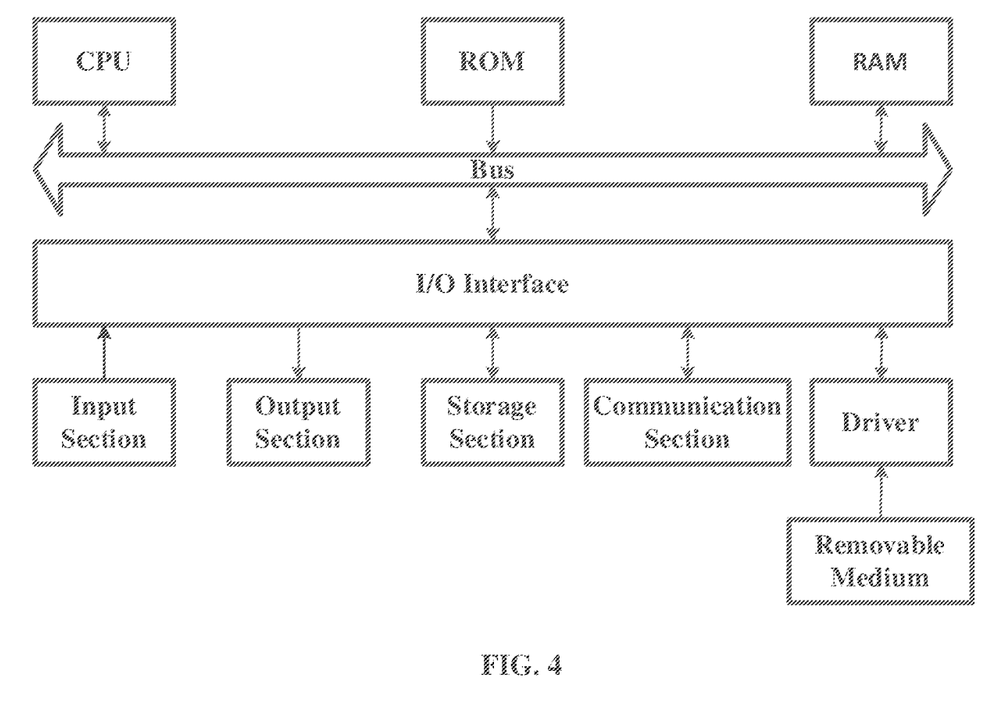
FIG. 4 is a schematic structure diagram illustrating a computer system provided in an embodiment of the present disclosure.

FIG. 4 is a schematic structure diagram illustrating a computer system according to an embodiment of the present disclosure. The computer system can be used for realizing the terminal devices 100 or the server 200 provided by the embodiment of the present disclosure.

As shown in FIG. 4, the computer system may include a central processing module (CPU) that can perform various appropriate actions and processes according to a program stored in a Read Only Memory (ROM) or a program loaded from a storage section into a Random Access Memory (RAM). In the RAM, various programs and data necessary for an operation of the computer system are also stored. The CPU, ROM and RAM are connected to each other via a bus. An input/output (I/O) interface is also connected to the bus.

The following components are connected to the I/O interface: an input section including a keyboard, a mouse, and the like; an output section including a Liquid Crystal Display (LCD), a speaker, and the like; a storage section including a hard disk, and the like; and a communication section including a network interface card such as a LAN card, a modem, or the like. The communication section performs communication processing via a network such as the Internet. A drive is also connected to the I/O interface as needed. A removable medium such as a magnetic disk, an optical disk, a magneto-optical disk, a semiconductor memory, or the like is mounted on the drive as needed, so that a computer program read out therefrom is mounted into the storage section as needed.

In particular, the process described by the flowcharts hereinabove may be implemented as a computer software program according to the present embodiment. For example, the present embodiment includes a computer program product comprising a computer program tangibly embodied on a computer readable medium, the computer program comprising program codes for performing the method illustrated in the flowchart. In such an embodiment, the computer program may be downloaded and installed from a network via the communication section, and/or installed from a removable medium.

The flowcharts and schematic diagrams in the figures illustrate the architecture, functionality, and operation of possible implementations of the system, method and computer program product according to the present embodiment. In this regard, each block in the flowcharts or schematic diagrams may represent a module, program segment, or portion of codes, which comprises one or more executable instructions for implementing specified logical function(s). It should also be noted that, in some alternative implementations, the functions noted in the blocks may occur in an order different from that noted in the figures. For example, two blocks shown in succession may, in fact, be executed substantially concurrently, or they may sometimes be executed in a reverse order, depending upon the function involved. It will also be noted that each block of the schematic diagrams and/or flowcharts, and combinations of blocks in the schematic diagrams and/or flowcharts, can be implemented by a special purpose hardware-based system which performs specified functions or operations, or implemented by a combination of special purpose hardware and computer instructions.

The modules described in the present embodiment may be implemented by software or hardware. The described modules may also be provided in a processor, for example, it may be described as: a processor, comprising a voice recognition module, a semantic matching module and a determination module. Wherein, the names of these modules do not in some cases constitute a limitation on the modules themselves. For example, the semantic matching module can also be described as "a semantic comparison module".

As another aspect, the present embodiment also provides a non-volatile computer storage medium, which may be a non-volatile computer storage medium included in an apparatus in the above embodiment, or may be a non-volatile computer storage medium that exists separately and is not installed in a terminal. The above non-volatile computer storage medium stores one or more programs that, when executed by a device, cause the device to: perform voice recognition on collected voice signals to acquire an input sentence; perform semantic matching between the input sentence and a cached sample sentence to obtain a matching result; determine whether the matching result indicates there is a sample sentence having the same or similar sentences as the input sentence: if yes, cached response content corresponding to the sample sentence having the same or similar semantics as the input sentence is used as response content of the input sentence; if no, at least one of the input sentence or the collected voice signals is sent to a server so that the server performs semantic understanding of the at least one of the input sentence or the collected voice signals according to a knowledge base stored on the server, acquires response content of the input sentence and returns the response content; and respond to the input sentence according to the response content.

The technical solution of the present disclosure can dramatically reduce the processing pressure of the server, reduce the cost of the server and improve the response speed of voice interaction without excessively increasing the requirements for the processing performance and storage space of the terminal device, and is particularly suitable for situations where a server or a server cluster consisting of a limited number of servers provides voice interaction service for a large number of terminal devices at the same time.

It is to be noted that terms used in the present disclosure to describe relations such as a first and a second are only used to distinguish one entity or operation from another, but shall not require or suggest that these entities or operations have such an actual relation or sequence. Furthermore, the term "comprising", "including" or any other variable intends to cover other nonexclusive containing relations to ensure that a process, method, article or apparatus comprising a series of factors comprises not only those factors but also other factors not explicitly listed, or further comprises factors innate to the process, method, article or apparatus. Without more limitations, a factor defined with the sentence "comprising one" does not exclude the case that the process, method, article or apparatus comprising said factor still comprises other identical factors.

Obviously, the above examples of the present disclosure are provided only to clearly illustrate the present disclosure, but shall by no means limit the embodiment of the present disclosure. Those skilled in the art may make modifications or changes in any different form on the basis of the above illustration. Not all embodiments can be exemplified here, and any obvious change or modification based on the technical solution of the present disclosure still falls into the scope of protection sought for in the present disclosure.

What is claimed is:

1. A method performed by a terminal device, comprising:
    performing voice recognition on collected voice signals to acquire an input sentence;
    performing semantic matching between the input sentence and cached sample sentences to determine whether there is a sample sentence having the same or similar semantics as the input sentence among the cached sample sentences;
    in response to determining that there is a sample sentence having the same or similar semantics as the input sentence among the cached sample sentences, acquiring cached response content corresponding to the sample sentence having the same or similar semantics as the input sentence as first response content of the input sentence;
    in response to determining that there is no sample sentence having the same or similar semantics as the input sentence among the cached sample sentences, sending at least one of the input sentence or the collected voice signals to a server, and receiving transmitted response content of the at least one of the input sentence or the collected voice signals from the server as the first response content of the input sentence, wherein the transmitted response content of the at least one of the input sentence or the collected voice signals from the server is acquired by the server through semantic understanding of the at least one of the input sentence or the collected voice signals according to a knowledge base stored on the server; and responding to the input sentence according to the first response content of the input sentence, wherein the first response content of the input sentence further comprises a control instruction and the responding to the input sentence according to the first response content of the input sentence includes performing a corresponding action according to the control instruction.

2. The method according to claim 1, wherein:
the first response content of the input sentence further comprises voice response content; and
the responding to the input sentence according to the first response content of the input sentence further includes carrying out a voice broadcast on the voice response content.

3. The method according to claim 2, wherein:
the control instruction comprises one or more execution instructions for controlling one or more applications to perform one or more operations.

4. The method according to claim 3, wherein:
the control instruction is preset manually by a user of the terminal device or preset automatically by the terminal device based on a user profile of the user or by the server based on the user profile of the user.

5. The method according to claim 2, wherein:
the control instruction comprises a plurality of execution instructions that are to be executed in a preset execution sequence.

6. The method according to claim 5, wherein:
the execution sequence of the plurality of execution instructions is preset based on at least one of:
a manual configuration by a user of the terminal device;
configurations by the terminal device based on a user profile of the user or by the server based on the user profile of the user; or
big data obtained by the server.

7. The method according to claim 1, wherein at least one of the cached sample sentences or response content of the cached sample sentences is pre-configured and/or updated based on at least one of:
a manual configuration by a user of the terminal device;
an initial system configuration;
configurations based on a user profile that are at the terminal device or at the server; or
big data obtained by the server.

8. The method according to claim 1, further comprising:
updating at least one of the cached sample sentences or response content of the cached sample sentences according to the input sentence and the first response content of the input sentence.

9. The method according to claim 8, wherein the updating at least one of the cached sample sentences or the response content of the cached sample sentences according to the input sentence and the first response content of the input sentence further comprises:
determining an acquisition frequency of the input sentence;
comparing the acquisition frequency of the input sentence to a first preset threshold; and
in response to determining that the acquisition frequency of the input sentence is greater than the first preset threshold, update at least one of the cached sample sentences and the response content of the cached sample sentences according to the input sentence and the first response content of the input sentence.

10. A terminal device, comprising:
a memory, storing computer instructions thereon; and
a processor coupled to the memory, wherein when the processor executes the computer instructions, the processor is configured to:

perform voice recognition on collected voice signals to acquire an input sentence;

performing semantic matching between the input sentence and cached sample sentences to determine whether there is a sample sentence having the same or similar semantics as the input sentence among the cached sample sentences;

in response to determining that there is a sample sentence having the same or similar semantics as the input sentence among the cached sample sentences, acquire cached response content corresponding to the sample sentence having the same or similar semantics as the input sentence as first response content of the input sentence;

in response to determining that there is no sample sentence having the same or similar semantics as the input sentence among the cached sample sentences, send at least one of the input sentence or the collected voice signals to a server, and receive transmitted response content of the at least one of the input sentence or the collected voice signals from the server as the first response content of the input sentence, wherein the transmitted response content of the at least one of the input sentence or the collected voice signals from the server is acquired by the server through semantic understanding of the at least one of the input sentence or the collected voice signals according to a knowledge base stored on the server; and respond to the input sentence according to the first response content of the input sentence, wherein the first response content of the input sentence further comprises a control instruction and the responding to the input sentence according to the first response content of the input sentence includes performing a corresponding action according to the control instruction.

11. The terminal device according to claim 10, wherein:
the first response content of the input sentence further comprises voice response content; and
when the processor executes the computer instructions, the processor is further configured to respond to the input sentence according to the first response content of the input sentence by
carrying out a voice broadcast on the voice response content.

12. The method according to claim 11, wherein:
the control instruction comprises one or more execution instructions for controlling one or more applications to perform one or more operations.

13. The method according to claim 12, wherein:
the control instruction is preset manually by a user of the terminal device or preset automatically by the terminal device based on a user profile of the user or by the server based on the user profile of the user.

14. The method according to claim 11, wherein:
the control instruction comprises a plurality of execution instructions that are to be executed in a preset execution sequence.

15. The method according to claim 14, wherein:
the execution sequence of the plurality of execution instructions is preset based on at least one of:
a manual configuration by a user of the terminal device;
configurations by the terminal device based on a user profile of the user or by the server based on the user profile of the user; or
big data obtained by the server.

16. The terminal device according to claim 10, wherein at least one of the cached sample sentences or response content of the cached sample sentences are pre-configured and/or updated based on at least one of:
a manual configuration by a user of the terminal device;
an initial system configuration;
configurations based on a user profile that are at the terminal device or at the server; or
big data obtained by the server.

17. The terminal device according to claim 10, wherein when the processor executes the computer instructions, the processor is further configured to:
update at least one of the cached sample sentences or response content of the cached sample sentences according to the input sentence and the first response content of the input sentence.

18. The terminal device according to claim 17, wherein when the processor executes the computer instructions, the processor is further configured to update at least one of the cached sample sentences or the response content of the cached sample sentences according to the input sentence and the first response content of the input sentence by performing the following operations:
determining an acquisition frequency of the input sentence;
comparing the acquisition frequency of the input sentence to a first preset threshold; and
in response to determining that the acquisition frequency of the input sentence is greater than the first preset threshold, updating at least one of the cached sample sentences and the response content of the cached sample sentences using the input sentence and the first response content of the input sentence.

19. A voice interaction system, comprising:
a terminal device configured to:
perform voice recognition on collected voice signals to acquire an input sentence, perform semantic matching between the input sentence and cached sample sentences to determine whether there is a sample sentence having the same or similar semantics as the input sentence among the cached sample sentences, in response to determining that there is a sample sentence having the same or similar semantics as the input sentence among the cached sample sentences, acquire cached response content corresponding to the sample sentence having the same or similar semantics as the input sentence as first response content of the input sentence, in response to determining that there is no sample sentence having the same or similar semantics as the input sentence among the cached sample sentences, send at least one of the input sentence or the collected voice signals to a server, and receive transmitted response content of the at least one of the input sentence or the collected voice signals from the server as the first response content of the input sentence, and respond to the input sentence according to the first response content of the input sentence, wherein the first response content of the input sentence further comprises a control instruction and the responding to the input sentence according to the first response content of the input sentence includes performing a corresponding action according to the control instruction; and the server, wherein the server is configured to:
receive the at least one of the input sentence or the collected voice signals from the terminal device, and perform semantic understanding of the at least one of the input sentence or the collected voice signals according to a knowledge base stored on the server to acquire the transmitted response content of the at least one of the input sentence or the collected voice signals, and send the transmitted response content of the at least one of the input sentence or the collected voice signals to the terminal device.

20. A non-transitory computer-readable storage medium having stored thereon a computer program, wherein the program, when executed by a processor, implements the method according to claim 1.

* * * * *

UNITED STATES PATENT AND TRADEMARK OFFICE
CERTIFICATE OF CORRECTION

PATENT NO. : 12,223,957 B2
APPLICATION NO. : 17/752094
DATED : February 11, 2025
INVENTOR(S) : Yingjie Li Page 1 of 1

It is certified that error appears in the above-identified patent and that said Letters Patent is hereby corrected as shown below:

In the Claims

Column 24, Line 8, Claim 10, delete "preforming" and insert -- perform --

Column 24, Line 54, Claim 12, delete "method" and insert -- terminal device --

Column 24, Line 58, Claim 13, delete "method" and insert -- terminal device --

Column 24, Line 63, Claim 14, delete "method" and insert -- terminal device --

Column 25, Line 1, Claim 15, delete "method" and insert -- terminal device --

Signed and Sealed this
Eighth Day of April, 2025

Coke Morgan Stewart
*Acting Director of the United States Patent and Trademark Office*